US 6,702,878 B2

(12) United States Patent
Ito et al.

(10) Patent No.: US 6,702,878 B2
(45) Date of Patent: Mar. 9, 2004

(54) HYDROGEN-PERMEABLE MEMBRANE, MANUFACTURING METHOD OF THE SAME, AND HYDROGEN GAS SEPARATOR USING THE SAME

(75) Inventors: Naoki Ito, Yokohama (JP); Masahiko Iijima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 10/259,874

(22) Filed: Sep. 30, 2002

(65) Prior Publication Data
US 2003/0061937 A1 Apr. 3, 2003

(30) Foreign Application Priority Data

Oct. 2, 2001 (JP) ......................................... 2001-306598

(51) Int. Cl.⁷ .......................... B01D 53/22; B01D 71/02
(52) U.S. Cl. ............................. 96/11; 95/56; 55/DIG. 5
(58) Field of Search .......................... 95/56; 96/4, 11; 55/524, DIG. 5

(56) References Cited

U.S. PATENT DOCUMENTS

| 3,350,846 A | * | 11/1967 | Makrides et al. ............... 95/56 |
| 5,139,541 A | * | 8/1992 | Edlund ............................ 95/56 |
| 5,215,729 A | * | 6/1993 | Buxbaum ...................... 423/248 |
| 5,217,506 A | | 6/1993 | Edlund et al. |
| 5,259,870 A | * | 11/1993 | Edlund ............................ 95/56 |
| 5,393,325 A | * | 2/1995 | Edlund ............................ 95/56 |
| 5,498,278 A | * | 3/1996 | Edlund ............................ 96/11 |
| 5,738,708 A | * | 4/1998 | Peachey et al. ................. 95/56 |
| 5,997,594 A | * | 12/1999 | Edlund et al. .................... 48/76 |
| 6,214,090 B1 | * | 4/2001 | Dye et al. ......................... 95/56 |
| 6,267,801 B1 | * | 7/2001 | Baake et al. ..................... 95/56 |
| 6,319,306 B1 | * | 11/2001 | Edlund et al. ..................... 96/7 |
| 6,350,297 B1 | * | 2/2002 | Doyle et al. .................... 95/55 |
| 6,475,268 B2 | * | 11/2002 | Thornton ........................ 96/11 |
| 2002/0062738 A1 | * | 5/2002 | Yoshida et al. ................. 96/11 |

FOREIGN PATENT DOCUMENTS

| JP | A 7-185277 | 7/1995 |
| JP | A-8215547 | 8/1996 |
| JP | A 11-276866 | 10/1999 |
| JP | A 2001-170460 | 6/2001 |

* cited by examiner

Primary Examiner—Robert H. Spitzer
(74) Attorney, Agent, or Firm—Oliff & Berridge, PLC

(57) ABSTRACT

A hydrogen-permeable membrane includes a metal base layer containing a Group VA element, two metal middle layers which are formed on both of the two sides of the metal base layer and containg an element selected from Ni and Co, and two metal coating layers formed on the side of the two metal middle layers, on which the metal base layer is not formed, and containing Pd.

17 Claims, 7 Drawing Sheets

HYDROGEN-PERMEABLE MEMBRANE, MANUFACTURING METHOD OF THE SAME, AND HYDROGEN GAS SEPARATOR USING THE SAME

INCORPORATION BY REFERENCE

The disclosure of Japanese Patent Application No. 2001-306598 filed on Oct. 2, 2001, including the specification, drawings and abstract is incorporated herein by reference in its entirety.

BACKGROUND OF THE INVENTION

1. Field of Invention

The invention relates to a hydrogen-permeable membrane, a manufacturing method thereof, and a hydrogen gas separator using the hydrogen-permeable membrane.

2. Description of Related Art

A fuel cell system is provided with a fuel cell, a fuel gas supplying portion for supplying a fuel gas containing a hydrogen gas to the fuel cell, and an oxidizing gas supplying portion for supplying an oxidizing gas containing an oxygen gas to the fuel cell. As a method of supplying a fuel gas, there are a method of directly supplying a hydrogen gas which has been stored in a tank or a hydrogen cylinder and a method of supplying a hydrogen gas by producing the hydrogen gas from a hydrocarbon compound such as methanol. In the case where the latter method is adopted, the fuel gas supplying portion bas a reforming portion for reforming the hydrocarbon compound to the hydrogen gas.

In the reforming portion, the hydrogen gas and other gases are, in general, generated. Accordingly, in the fuel gas supplying portion, a hydrogen-permeable membrane is sometimes used in order to extract the hydrogen gas from mixed gases which have been generated in the reforming portion.

In Japanese Patent Application Laid-Open No. 11-276866, a hydrogen-permeable membrane, in which Pd (Palladium) coating layers are formed on both sides of a V (Vanadium) base layer, is disclosed. However, the hydrogen permeating membrane has a problem that hydrogen permeability deteriorates due to mutual diffusion of V and Pd.

Further, in Japanese Patent Application Laid-open No. 7-185277, a hydrogen-permeable membrane, in which an $SiO_2$ middle layer is interposed between a V base layer and a Pd coating layer, is disclosed. Although this hydrogen-permeable membrane can reduce diffusion of V and Pd, it has a problem that hydrogen permeability of a ceramic middle layer such as $SiO_2$ is low.

SUMMARY OF THE INVENTION

It is an object of the invention to reduce deterioration of hydrogen permeability due to mutual diffusion of metals in a hydrogen-permeable membrane.

A first aspect of the invention relates to a hydrogen-permeable membrane through which only hydrogen is selectively permeable. This hydrogen-permeable membrane is formed on a metal base layer which contains a Group VA element, a metal middle layer which is formed on at least one or first and second sides of the metal base layer and contains at least one selected element selected from Ni (Nickel) and Co (Cobalt), and a metal coating layer which is formed on a side of the metal middle layer, on which the metal base layer is not formed, and contains Pd (Palladium).

Note that the "Group VA" here is also referred to as a "Group 5."

It should be noted here that a "solid solubility limit" means the maximum concentration (saturated concentration) of a second element which is solid-soluble to a solid made of the first element at a certain temperature. The solid solubility limit varies in accordance with a temperature and kinds of the 2 elements.

A second aspect of the invention relates to a method of manufacturing a hydrogen-permeable membrane through which only hydrogen is selectively permeable. This method includes steps of:

(a) preparing a metal base layer containing a Group VA element;

(b) forming a metal middle layer containing at least one selected element selected from Ni (Nickel) and Co (Cobalt) on at least one of first and second sides of the metal base layer, and (c) forming a metal coating layer containing Pd (Palladium) on the side out of the two sides of the metal middle layer, on which the metal base layer is not formed.

By adopting this method, it is possible to manufacture a hydrogen-permeable membrane according to the first aspect of the invention. Also, a hydrogen gas separator having the hydrogen-permeable membrane of the first and second aspects falls within the scope of the invention.

BRIEF DESCRIPTION OF THE DRAWINGS

The foregoing and further objects, features and advantages of the invention will became apparent from the following description of preferred embodiments with reference to the accompanying drawings, wherein like numerals are used to represent like elements and wherein.

DETAILED DESCRIPTION OF THE PREFERRED EMBODIMENTS

The invention is applied to a variety of embodiments such as a fuel cell system using a hydrogen-permeable membrane, a device as a moving body mounted with the fuel cell system, a hydrogen refining device using the hydrogen-permeable membrane and the like.

Figure 1:
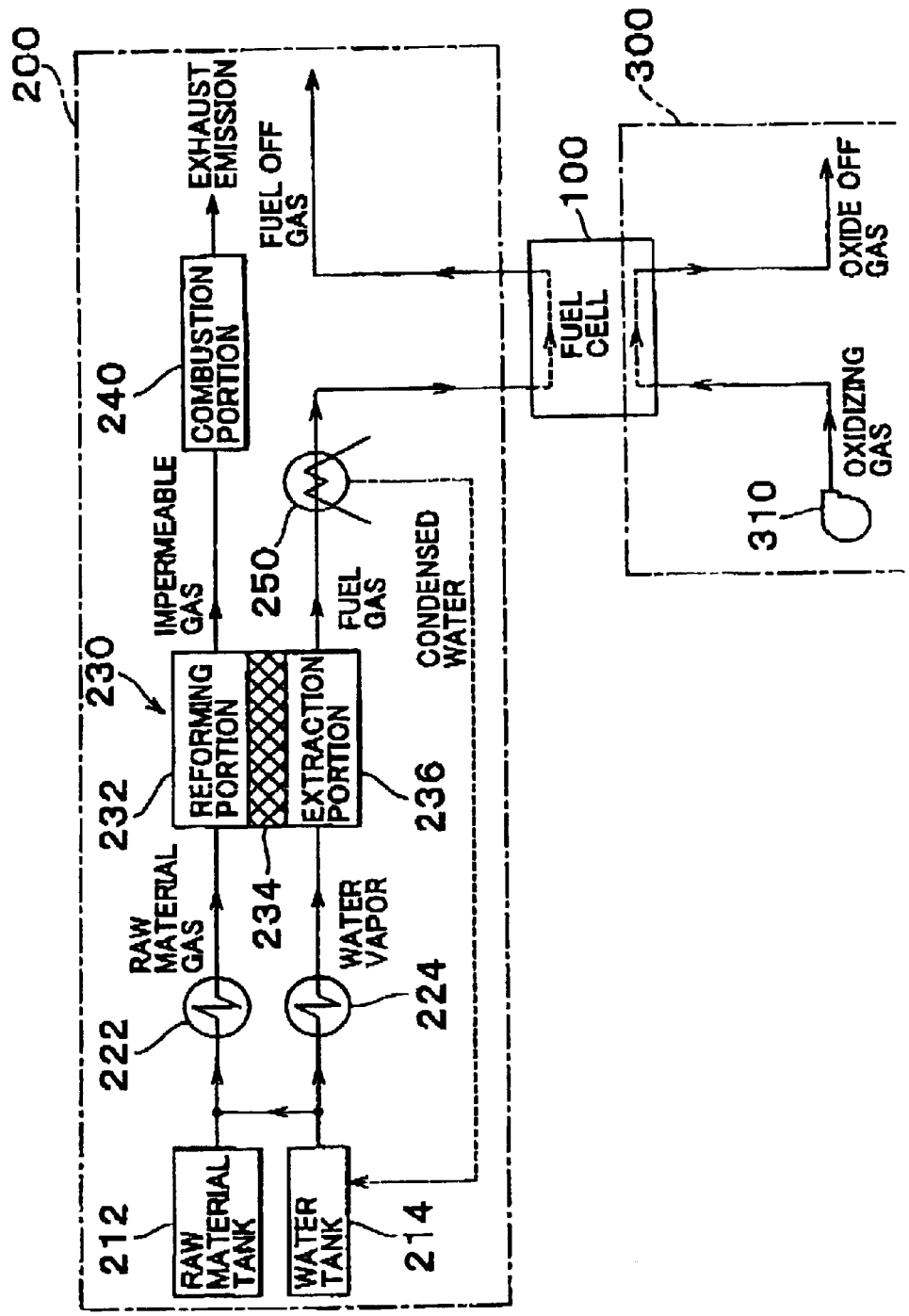
FIG. 1 is an explanatory view showing a schematic structure of a fuel cell system according to a preferred embodiment of the invention.

A. Fuel Cell System:

Next, a preferred embodiment of the invention will be explained hereafter. FIG. 1 is an explanatory view showing a schematic structure of a fuel cell system according to a preferred embodiment of the invention. This fuel cell system includes a fuel cell 100, a fuel gas supplying portion 200 for supplying a fuel gas including a hydrogen gas to the fuel cell, and an oxidizing gas supplying portion 300 for supplying an oxidizing gas to the fuel cell. At this point, the fuel cell 100 is a polymer electrolyte type fuel cell which is relatively small and has excellent power generation efficiency.

The fuel gas supplying portion 200 (FIG. 1) generates the fuel gas including the hydrogen gas and then supplies it to the fuel cell 100. The fuel gas supplying portion 200 includes a raw material tank 212, a water tank 214, two evaporators 222 and 224, a fuel gas generating portion 230, a combustion portion 240, and a condenser 250. Methanol is stored in the raw material tank 212.

Figure 2:
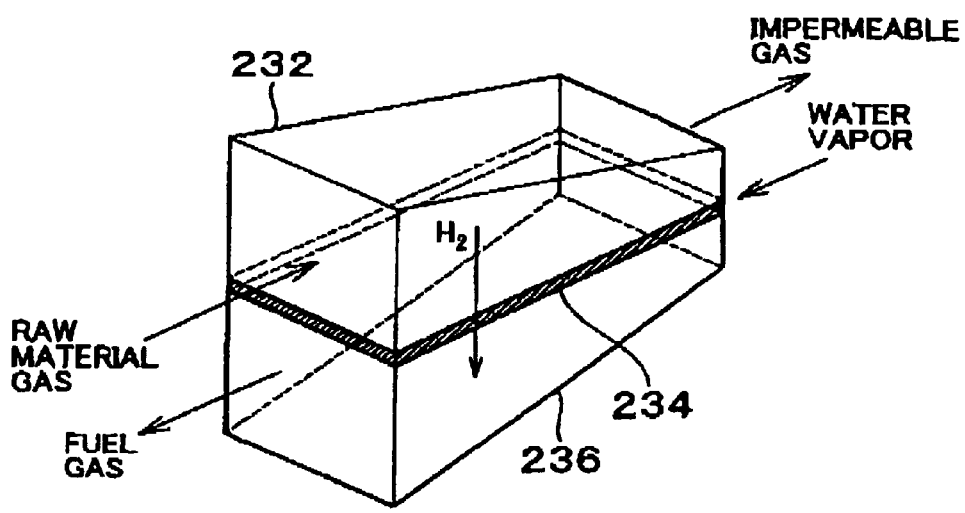
FIG. 2 is an explanatory view of one example of a fuel gas generating portion 230.

The first evaporator 222 evaporates a mixed liquid introduced from the raw material tank 212 and the water tank 214 and then supplies the mixed gas of raw materials and water (hereafter referred to as a "raw material gas") to the fuel gas generating portion 230. The second evaporator 224 evaporates water introduced from the water tank 214 and then supplies water vapor to the fuel gas generating portion 230. At this point, although it is illustrated in FIG. 1 that the raw material gas and water vapor flow in the same direction, they actually flow in the opposite directions to each other as shown in FIG. 2.

The fuel gas generating portion 230 includes a reforming portion 232, a hydrogen-permeable membrane 234, and an extraction portion 236. FIG. 2 is an explanatory view of one example of the fuel gas generating portion 230. As illustrated, the fuel gas generating portion 230 is united, and the hydrogen-permeable membrane 234 is interposed between the reforming portion 232 and the extraction portion 236. The reforming portion 232 is supplied with the raw material gas from the first evaporator 222, and the extraction portion 236 is supplied with water vapor from the second evaporator 224.

The reforming portion 232 supports a catalyst which advances reforming reaction. As a catalyst, it is possible to use a Cuo-ZnO type catalyst and a Cu—ZnO type catalyst, for example. In the reforming portion 232, chemical reactions (reforming reactions) indicated in the following Expressions (1) and (2) Progress sequentially, and then a mixed gas containing a hydrogen gas is produced. Then, for the whole reforming portions, reforming reaction indicated in Expression (3) progresses.

$$CH_3OH \rightarrow CO + 2H_2 \quad (1)$$

$$CO + H_2O \rightarrow CO_2 + H_2 \quad (2)$$

$$CH_3OH + H_2O \rightarrow CO_2 + 3H_2 \quad (3)$$

The hydrogen-permeable membrane 234 separates the hydrogen gas by permeating the hydrogen gas selectively from the mixed gas (that is to say, the raw material gas, a carbon monoxide gas, a carbon dioxide gas, the hydrogen gas or the like) contained in the reforming portion 232. The hydrogen-permeable membrane 234 will be explained later.

The extraction portion 236 promotes permeation of the hydrogen gas in the hydrogen-permeable membrane 234 by using the supplied water vapor. That is to say, the hydrogen gas which is generated in the reforming portion 232 permeates the hydrogen-permeable membrane 234 in accordance with partial pressure difference of hydrogen in the reforming portion 232 and the extraction portion 236. Thus, in the embodiment, the partial pressure of hydrogen of the extraction portion 236 is made lower than the partial pressure of hydrogen of the reforming portion 232 by sequentially supplying water vapor to the extraction portion 236.

Further, the embodiment sets the full pressure of the extraction 236 to be higher than the full pressure of the reforming portion 232. This is to avoid mixing of carbon monoxide gas in the fuel gas which is obtained in the extraction portion 236. The is to say, if the carbon monoxide gas is mixed in the fuel gas, the catalyst of the fuel cell 100 is poisoned by the carbon monoxide gas, and then the stable electro-chemical reaction is inhibited. However, if the full pressure of the extraction portion 236 and the full pressure of the reforming portion 232 are set as mentioned above, even of a pin hole exists in the hydrogen-permeable membrane 234, it is possible to keep the carbon monoxide gas of the reforming portion 232 from leaking in the extraction portion 236. Further, if water vapor leaks from the extraction portion 236 to the reforming portion 232 through a pin hole of the hydrogen-permeable membrane 234, it is possible to use water vapor, which has leaked, for the purpose of the reforming reaction (Expression (3)). Note that if the pin hole does not exist in the hydrogen-permeable membrane 234, it is preferable to improve the efficiency of separation the hydrogen gas by setting the full pressure of the reforming portion 232 to be higher than the full pressure of the extraction portion 236.

Further, in the embodiment, as shown in FIG. 2, the raw material gas and water vapor flow in the opposite directions to each other in the reforming portion 232 and the extraction portion 236. The more downstream a place where the reforming reaction progresses is, the higher the partial pressure of hydrogen of the reforming portion 232 is. On the other hand, the more upstream a place where extraction of hydrogen gas does not progress well is, the lower the partial pressure of hydrogen of the extraction portion 236 is. As indicated in FIG. 2, in the case where the raw material gas and water vapor flow in the opposite directions to each other, a portion downstream of the reforming portion 232 is adjacent to a portion upstream of the extraction portion 236 via the hydrogen-permeable membrane 234. At this stage, the partial pressure of hydrogen of the extraction portion 236 considerably differs from the partial pressure of hydrogen of the reforming portion 232 in the portion downstream (that is to say, the portion upstream of the extraction portion 236) of the reforming portion 232, thus it is possible to separate the hydrogen gas effectively.

An impermeable gas (that is to say, a gas which did not permeate the hydrogen-permeable membrane 234) which is emitted from the reforming portion 232 is oxidized in the combustion portion 240 (FIG. 1). More specifically, the carbon monoxide gas among the impermeable gas is oxidized to carbon dioxide gas, and the hydrogen gas is oxidized to water vapor. Accordingly, release into the atmosphere of the carbon monoxide gas contained in the impermeable gas is avoided.

The fuel gas which has been emitted from the extraction portion 236 is supplied to the condenser 250. The condenser 250 supplies the fuel gas to the fuel cell 100 after condensing and removing water vapor contained in the fuel gas. At this stage, condensed water which is obtained in the condenser 250 is returned to the water tank 214.

An oxidizing gas supplying portion 300 (FIG. 1) is provided with a blower 310, and thus supplies an oxidizing gas (air) containing an oxygen gas to the fuel cell 100.

The fuel cell 100 generates electricity by using the fuel gas which has been supplied from the fuel gas supplying portion 200 and the oxidizing gas which has been supplied from the oxidizing gas supplying portion.

B. Hydrogen-Permeable Membrane

B-1 Structure of Hydrogen-Permeable Membrane

Figure 3:
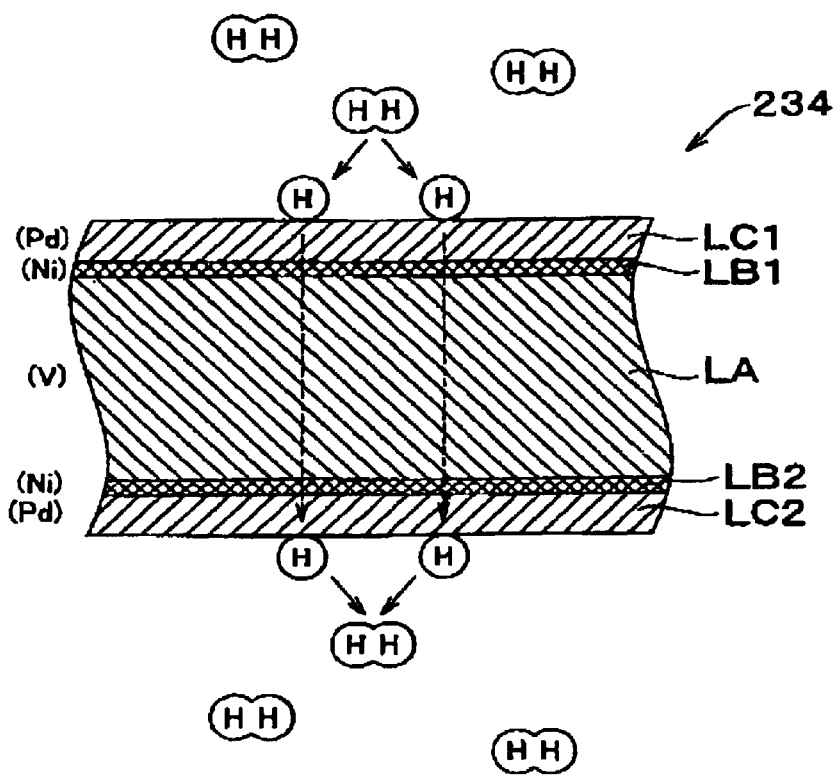
FIG. 3 is an explanatory view illustrating a cross section of a hydrogen-permeable membrane 234 of FIG. 1.

FIG. 3 is an explanatory view illustrationg a cross section of the hydrogen-permeable membrane 234 of FIG. 1. As shown in the figure, the hydrogen-permeable membrane 234 has a structure of five layers. More specifically, the hydrogen-permeable membrane includes one metal base layer LA, two metal middle layers LB1 and LB2 which are formed on both sides of the metal base layer, and two metal coating layers LC1 and LC2 which are formed on the external sides of respective metal middle layers. The metal base layer, the metal middle layer and the metal coating layer are formed with thickness of approximately 20 $\mu$m, 0.1 $\mu$m, and 0.3 $\mu$m, respectively, for example.

The metal base layer LA includes an element of group VA. For elements of group VA, V (vanadium), Nb (niobium), and Ta (tantalum) can be used. The metal middle layers LB1 and LB2 include an element selected from Ni (nickel) and Co (cobalt). The metal coating layers LC1 and LC2 include Pd (palladium).

Hereafter, an example in which the metal base layer LA is made of V, the metal middle layers LB1 and LB2 are made of Ni, and metal coating layers LC1 and LC2 are made of Pd, will be explained.

It has been thought that a hydrogen molecule permeates the hydrogen-permeable membrane 234 in the process as indicated in FIG. 3. That is to say, the hydrogen molecule is, first of all, dissociated into 2 hydrogen atoms in the first Pd coating layer LC1. The dissociated hydrogen atoms permeate sequentially each of the layers LC1, LB1, LA, LB2, and LC2. Then, two hydrogen atoms, which have permeated, recombine each other in the second Pd coating layer LC2, and then become the hydrogen molecule.

Apparent from the foregoing explanation, Pd which constitutes metal coating layers LC1 and LC2 has a catalytic function of accelerating recombination and dissociation of hydrogen, and further has a function of having hydrogen permeate the membrane. Further, Ni which constitutes the metal middle layers LB1 and LB2 and V which constitutes the metal base layer LA have a function of having hydrogen permeate the membrane. Meanwhile, hydrogen permeability of V is much higher than that of Pd.

Meanwhile, in the case where a hydrogen-permeable membrane, in which Pd coating layer is formed directly on both sides of the V base layers is used, there is a problem that hydrogen permeability of the hydrogen-permeable membrane deteriorates with time since V and Pd are gradually mutually diffused. Further, in the case where a hydrogen-permeable membrane, in which a ceramic middle layer is formed between the V base layer and the Pd coating layer, is used, although it is possible to lower diffusion of V and Pd, there is a problem that hydrogen permeability of the hydrogen-permeable membrane deteriorates. This is because only hydrogen in a molecular state is permeable through the ceramic middle layer. That is to say, each hydrogen needs to once recombine each other before permeating the ceramic middle layer, and needs to dissociate again after permeating it. Further, in the case where ceramic and metal are joined, it is difficult to manufacture the membrane, and further a crack or the like easily occurs in the hydrogen-permeable membrane due to difference in the thermal expansion rates.

In this way, according to the embodiment, as indicated in FIG. 3. Ni middle layers LB1 and LB2 are interposed between the V base layer LA and the Pd coating layers LC1 and LC2.

V and Ni constituting the base layer and the middle layer respectively have a solid solubility limit to each other at a certain temperature (approximately 700 to 1000° C.). Note that the "solid solubility limit" means the maximum concentration (saturated concentration) of the second element which can be added to a solid made of the first element at a certain temperature. The solid solubility limit varies in accordance with temperature and kinds of two elements. If Ni is saturated in the V base layer and V is saturated in the Ni middle layer, mutual diffusion of V and Ni is suppressed.

Ni and Pd constituting the middle layer and the coating layer respectively are mutually diffused to some extent. However, Ni, as well as Pd, has the function of having hydrogen permeate the membrane and also has the catalytic function of accelerating dissociation and recombination of each hydrogen. Accordingly, hydrogen permeability does not deteriorate much due to mutual diffusion of Ni and Pd.

Meanwhile, in the case where a V layer and a Pd layer are joined, it has been reported that diffusion of V to Pd is accelerated under the existence of hydrogen (Journal of Membrane Science 107, (1995) pp. 147–153). However, in the embodiment, Ni middle layer is interposed between the V base layer and the Pd coating layer. Accordingly, even if hydrogen exists, diffusion of V to the Pd coating layer via the Ni middle layer is suppressed, on the other hand, since Ni and Pd are mutually diffused to some extent, Pd may be diffused to the V base layer via the Ni middle layer. However, since this diffusion is relatively small, it is thought that hydrogen permeability of the hydrogen-permeable membrane does not deteriorate much.

In this way, if the Ni middle layer is interposed between the V base layer and the Pd coating layer, it is possible to suppress mutual diffusion of the V base layer and the Ni middle layer. As a result, it is possible to reduce mutual diffusion of the Pd coating layer and the V base layer via the Ni middle layer. Therefore, it is possible to reduce degradation of hydrogen permeability due to mutual diffusion of metals in the hydrogen-permeable membrane.

As mentioned above, the solid solubility limits of V and Ni differ according to a temperature. More specifically, the higher temperature is, the higher the solid solubility limit is. The hydrogen-permeable membrane is used, in many cases, at a relatively high temperature (approximately 300 to 500° C., for example). Accordingly, at the start of using the hydrogen-permeable membrane, according to its temperature, mutual diffusion of V and Ni takes place and then hydrogen permeability of the hydrogen-permeable membrane varies (deteriorates) with time. Accordingly, before starting the use of the hydrogen-permeable membrane, it is preferable to keep the V base layer in a condition where it contains Ni having a concentration which is equal to or more than the solid solubility limit (saturated concentration) at the usage temperature in the vicinity of an interface with the Ni middle layer.

Figure 4A:
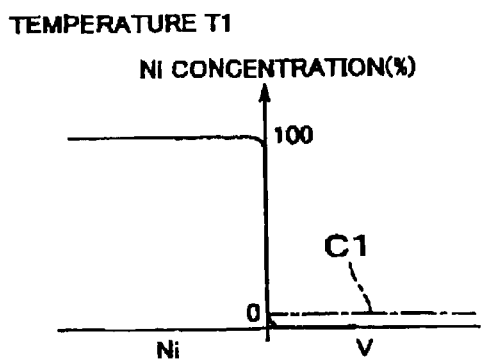
FIGS. 4A–4C are explanatory views illustrating a concentration of Ni distribution in the vicinity of the interface between a v base layer and a Ni middle layer.
Figure 4B:
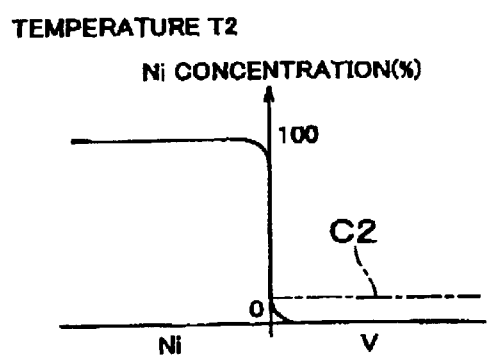
Figure 4C:
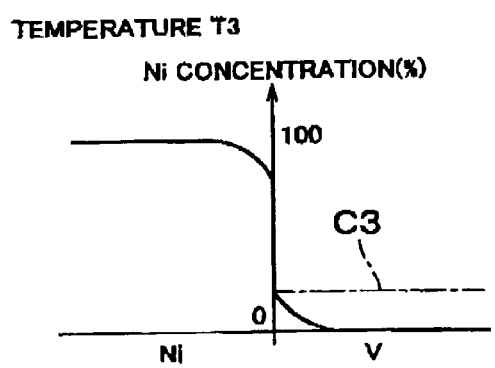

FIGS. 4A–4C are explanatory views illustrating the concentration of Ni in the vicinity of the interface between the V base layer and the Ni middle layer.

FIG. 4A indicates a distribution of the Ni concentration at a temperature T1 (substantially normal temperature). Since Solid solubility limit C1 of Ni to V at the temperature T1 is considerably low, Ni is not diffused much to the V base layer at the temperature T1.

FIG. 4B indicates a distribution of the Ni concentration at a temperature T2 (the usage temperature of the hydrogen-permeable membrane: approximately 400° C., for example). Solid solubility limit C2 of Ni to V at the temperature T2 is greater than the solid solubility limit C1 at the temperature T1. Accordingly, relatively much Ni diffuses in the V base layer.

FIG. 4C indicates a distribution of the Ni concentration at a temperature T3 (a temperature higher than the usage temperature of the hydrogen-permeable membrane: approximately 500° C. for example). The solid solubility limit C3 at the temperature T3 is greater than the solid solubility limit C2 at the temperature T2. Accordingly, Ni is diffused most in the V base layer among FIGS. 4A to 4C.

Note that FIGS. 4A to 4C indicate the distributions when the thermal treatment is performed on the hydrogen-permeable membrane for a relatively short time period at the temperatures T1 to T3. Here, the thermal treatment refers to a thermal treatment in a broad sense and also includes a treatment of leaving the membrane for a predetermined time period at a normal temperature. In the V base layer, the Ni concentration in the vicinity of the interface is nearly equal to the solid solubility limits C1 to C3. Further, the distribution of the Ni concentration in the V base layer becomes gradually smaller along the thickness direction thereof. That is to say, the V base layer contains Ni only in the vicinity of the interface. However, if the thermal treatment is performed on the hydrogen-permeable membrane for an infinitely long time period at each temperature T1 to T3, it is thought that the distributions of the Ni concentration along the thickness direction of the V base layer will be substantially homogeneous with a substantially equal concentration to each solid solubility limit C1 to C3 as indicated by each single dot line in the figures.

Apparent from the foregoing explanation, as shown in FIGS. 4B and 4C, if the thermal treatment is performed beforehand at the temperature T2 or T3 which is equal to or higher than the usage temperature of the hydrogen-permeable membrane, the V base layer becomes in a state where it contains Ni having a concentration which is equal to or more than the solid solubility limit (saturating temperature) at the usage temperature in the vicinity of the interface with the Ni middle layer. In this way, after the start or using the hydrogen-permeable membrane, since it is possible to suppress further diffusion of Ni in the V base layer, it is possible to suppress deterioration of hydrogen permeability with time of the hydrogen-permeable membrane.

Note that, although the distribution of the Ni concentration in the vicinity of the interface between the V base layer and the Ni middle layer is explained with reference to FIG. 4, the distribution of the V concentration is the same. That is to say, before the start of using the hydrogen-permeable membrane, if the Ni middle layer contains V having a concentration which is equal to or more than the solid solubility limit (saturating temperature) at the usage temperature in the vicinity of the interface with the V base layer, it is possible to suppress deterioration of hydrogen permeability with time after the start of use.

B-2. Method of Manufacturing Hydrogen-Permeable Membrane

Figure 5:
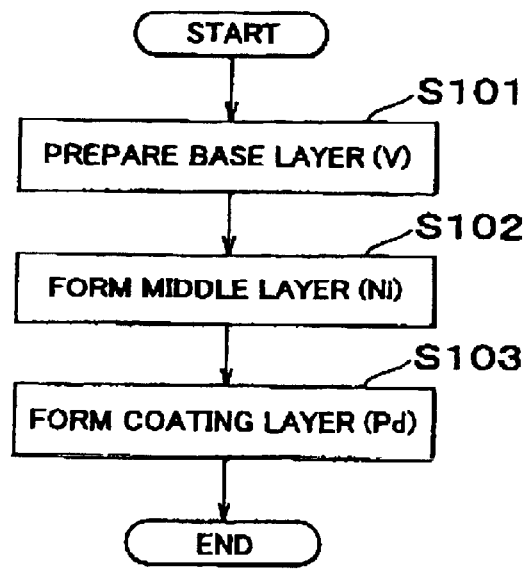
FIG. 5 is a flowchart of a first manufacturing procedure of the hydrogen-permeable membrane.

FIG. 5 is a flowchart of a first manufacturing procedure of the hydrogen-permeable membrane. At step S101, the base layer (foil), which is made of V, is prepared. The V base layer is etched by an alkali solution and then impurities such as oxide membranes formed on the surface are removed. According to this, it is possible to reduce deterioration of hydrogen permeability of the hydrogen-permeable membrane, which is caused by the residual impurities. At step S102, two middle layers, which are made of Ni, are formed on both sides of the V base layer. It is possible to form the Ni middle layer by electroless plating or electroplating. At step S103, two coating layers, which are made of Pd, are formed on the external side of each Ni middle layer.

It is possible to form the Pd coating layer by electroless plating or electroplating. According to this, the hydrogen-permeable membrane, which has the distribution of the concentration of Ni as indicated in FIG. 4A, is formed.

Figure 6:
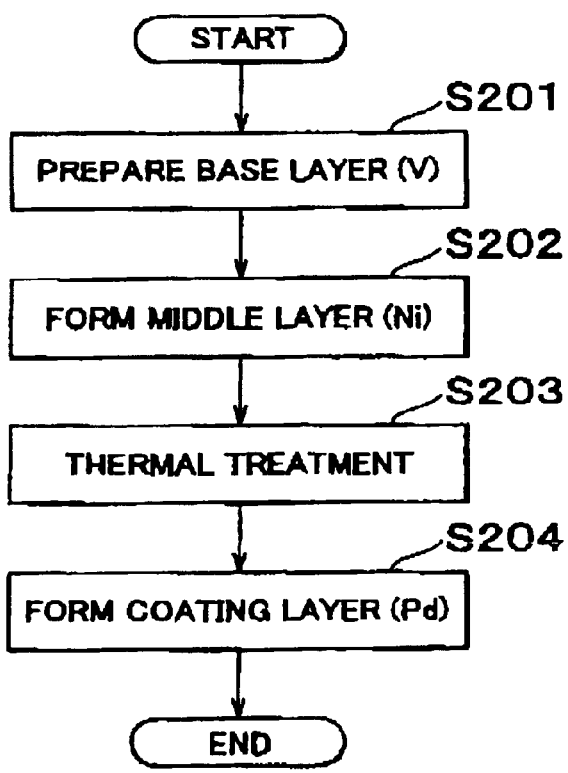
FIG. 6 is a flowchart of a second manufacturing procedure of the hydrogen-permeable membrane.

FIG. 6 is a flowchart of a second manufacturing procedure of the hydrogen-permeable membrane. Note that steps S201, S202, and S204 of FIG. 6 are the same as steps S101, S102, and S103 of FIG. 5. At step S203, thermal treatment is performed in a state where the Ni middle layer is formed on both sides of the V base layer. More specifically, thermal treatment is performed in the nitrogen atmosphere at a temperature equal to or higher than the usage temperature of the hydrogen-permeable membrane. Note that the temperature of thermal treatment is set higher than the usage temperature by approximately 0 to 100° C. Time period of thermal treatment is set at approximately twenty-four hours, for example. Accordingly, Ni is diffused till the solid solubility limit is reached at the temperature of thermal treatment in the vicinity of the interface of the V base layer. According to this, the hydrogen-permeable membrane, which has the distribution of the concentration of Ni as indicated in FIGS. 4B and 4C, is formed.

Figure 7:
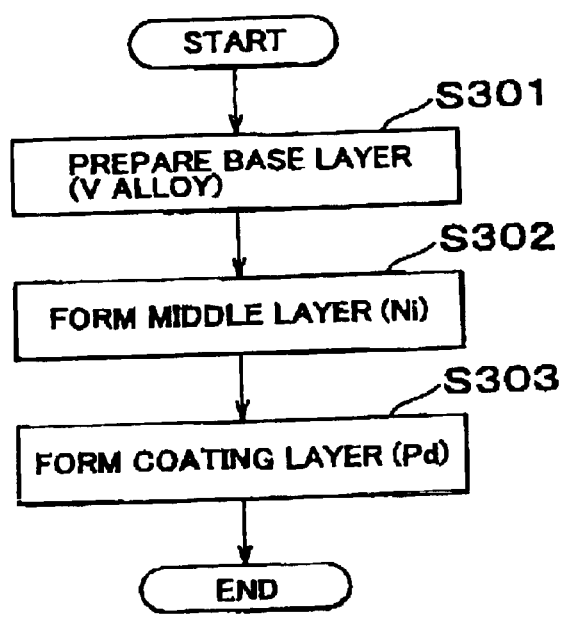
FIG. 7 is a flowchart of a third manufacturing procedure of the hydrogen-permeable membrane.

FIG. 7 is a flowchart of the third manufacturing procedure of the hydrogen-permeable membrane. Note that steps S302 and S303 of FIG. 7 are the same as steps S102 and S103 of FIG. 5. At step S301, a V alloy base layer (foil), which contains Ni having a concentration which is equal to or more than the solid solubility limit at the usage temperature of the hydrogen-permeable membrane in the V alloy base layer, is prepared. Note that it is possible to obtain the V alloy base layer easily by, for example, cooling it rapidly after heating it at a temperature inherent to the alloy and then rolling it. By cooling it rapidly like this, it is possible to obtain the V alloy in a solid-soluble state without causing precipitation of Ni in the V alloy base layer. According to this, the V base layer having a distribution of the concentration Ni as indicated in FIGS. 4B and 4C by each single dot line, that is to say, the hydrogen-permeable membrane, which contains the V alloy bane layer having a substantially homogeneous distribution of concentration Ni along the thickness direction, is formed. Note that the meaning of the substantially homogeneous distribution of concentration Ni along the thickness direction is the distribution in which the concentration value of Ni of each region of the base layer is equal to or more than approximately 90% of the concentration value of Ni of the solid solubility limit at the usage temperature.

Note that although thermal treatment is performed after the Ni middle layer is formed in FIG. 6 (step S203), in the same way, thermal treatment may be performed after the Ni middle layer is formed of FIGS. 5 and 7. Further, in FIGS. 5 to 7, in place of, or together with, the thermal treatment after the middle layer is formed, thermal treatment may be performed after Pd coating layer is formed.

Meanwhile, it is possible to measure distribution of the concentration of Ni of the base layer as indicated below, for example. That is to say, in the case where Ni exists only in the vicinity of the interface between the base layer and the middle layer, it is preferable to measure the distribution using the auger electron spectroscopy (AES) method. Further, in the case where a substantially homogeneous distribution of the concentration of Ni exists along the thickness direction of the base layer, it is preferable to measure the distribution using the electron probe microanalysis method (EPMA). In place of this, it is possible to measure the distribution using a combination of a scanning electron microscope (SEW) and an energy distersive x-ray spectrometer (ESX).

In the above embodiment, although a case where V, Ni, and Pd are used is explained, in place of V, Nb and Ta which have the same property may be used, or in place of Ni, Co which has the same property may also be used. Detailed explanation is not given to such a case, since the foregoing explanation can be applied in the same way.

As explained above, the hydrogen-permeable membrane according to the embodiment includes a metal base layer LA containing a Group VA element, two metal middle layers LB1 and LB2 formed on the two sides of the metal base layer LA respectively, and containing an element selected from Ni and Co, and two metal coating layers LC1 and LC2 formed on the side of the two metal middle layers, on which the metal base layer is not formed, containing Pd. By adopting such a structure, it is possible to suppress mutual diffusion between the metal base layer and the metal middle layer. As a result, it is possible to reduce diffusion between the metal coating layer and the metal base layer via the metal middle layer. Therefore, it is possible to reduce deterioration of the hydrogen-permeable membrane due to mutual diffusion of metals in the hydrogen-permeable membrane.

Note that in the embodiment, although the hydrogen-permeable membrane has a structure of five layers of Pd—Ni—V—Ni—Pd, it may be possible to have a structure of three layers of Pd—Ni—V.

That is to say, it is enough that the hydrogen-permeable membrane includes a metal base layer containing a Group VA element, a metal middle layer formed at least on one side out of the two sides of the metal base layer and containing an element selected from Ni and Co, and a metal coating layer formed on the side out of the two sides of the metal middle layer, on which the metal base layer is not formed, and containing Pd.

The invention is not limited to the above-mentioned embodiment. It is possible to apply the invention to various kinds of application within the scope of the summary of the invention. For example, the following modifications are possible.

In the above-mentioned embodiment (FIG. 1), the combustion portion 240 for treating the carbon monoxide gas which has been generated by reforming reaction is provided downstream of the reforming portion 232. However, in place of it, a shift portion and a CO oxidizing portion may be provided. Note that the shift portion generates hydrogen gas and carbon dioxide gas from carbon monoxide gas and water vapor. The CO oxidizing portion generates carbon dioxide gas by oxidizing carbon monoxide gas which has not been treated by the shift portion. In the case where the shift portion is provided like this, the hydrogen-permeable membrane may be provided in the shift portion. It is possible to improve efficiency of using the hydrogen gas if the hydrogen gas which is obtained from the shift portion is mixed with the fuel gas emitted from the extraction portion 236 and then such a mixed gas is supplied to the fuel cell 100.

In the embodiment above, although the fuel cell system is provided with the fuel gas supplying portion 200 for generating the fuel gas containing the hydrogen gas using methanol, in place of this, it may be provided with the fuel gas supplying portion for generating the fuel gas containing the hydrogen gas using other alcohol, natural gas, gasoline, ether, aldehyde, and the like. In general, as a raw material, various kinds of hydrocarbon compounds containing hydrogen atoms may be used. In such a case, purity of hydrogen may be improved if the hydrogen-permeable membrane is used.

Further, in the embodiment, the fuel cell system is provided with the fuel gas supplying portion 200 for generating hydrogen gas by reforming methanol. However, in place of this, it may be provided with a fuel gas supplying portion for obtaining the hydrogen gas from a hydrogen adsorbing alloy (hydrogen storing alloy), a hydrogen cylinder, and the like. Also in this case, a hydrogen-permeable membrane may be applied in order to improve purity of the hydrogen In the embodiment above, although the hydrogen-permeable membrane 234 is an independent membrane, it may also be formed on a substrate. As a substrate, a porous substrate such as a sintered alloy and alumina through which hydrogen gas permeates may be used.

In the embodiment above, a case where the hydrogen-permeable membrane according to the invention is applied to the fuel cell system using a polymer electrolyte type fuel cell system, is explained. However, in place of it, the hydrogen-permeable membrane may also be applied to a fuel cell system using other type fuel cell system. Further, hydrogen-permeable membrane may also be applied to a hydrogen purifier.

What is claimed is:

1. A hydrogen-permeable membrane through which only hydrogen is selectively permeable, comprising:
   a metal base layer containing a Group VA element;
   a metal middle layer formed on at least one of first and second sides of the metal base layer, and containing at least one elemental metal selected from Nickel and Cobalt; and
   a metal coating layer formed on a side of the metal middle layer, on which the metal base layer is not formed, and containing Palladium.

2. The hydrogen-permeable membrane according to claim 1, wherein the metal middle layer is formed on the first and second sides of the metal base layer, respectively, and
   the metal coating layer is formed on a side of the two metal middle layers, on which the metal base layer is not formed.

3. The hydrogen-permeable membrane according to claim 1, wherein the metal base layer contains the elemental metal having a concentration which is equal to or more than a solid solubility limit at usage temperature of the hydrogen-permeable membrane at least in a vicinity of an interface with the metal middle layer.

4. The hydrogen-permeable membrane according to claim 3, wherein the metal base layer contains the elemental metal having a substantially homogeneous distribution of concentration along a thickness direction of the hydrogen-permeable membrane.

5. The hydrogen-permeable membrane according to claim 3, wherein the metal base layer contains the elemental metal only in the vicinity of the interface with the metal middle layer.

6. The hydrogen-permeable membrane according to claim 1, wherein
   the metal middle layer contains the Group VA element having a concentration which is equal to or more than the solid solubility limit at usage temperature of the hydrogen-permeable membrane at least in a vicinity of an interface with the metal base layer.

7. The hydrogen-permeable membrane according to claim 1, wherein the Group VA element is Vanadium.

8. A hydrogen gas separator, comprising:
   the hydrogen-permeable membrane according to claim 1;
   a reforming portion that generates a hydrogen gas by reforming a raw material gas; and
   a gas extraction portion being on the opposite side of the reforming portion from the hydrogen-permeable membrane.

9. The hydrogen-permeable membrane according to claim 1, wherein the metal middle layer consists essentially of said at least one elemental metal selected from Nickel and Cobalt.

10. The hydrogen-permeable membrane according to claim 1, wherein the metal middle layer consists of said at least one elemental metal selected from Nickel and Cobalt.

11. A method of manufacturing a hydrogen-permeable membrane through which only hydrogen is selectively permeable, comprising:

preparing a metal base layer containing a Group VA element;

forming a metal middle layer containing at least one elemental metal selected from Nickel and Cobalt on at least one of two sides of the metal base layer; and forming a metal coating layer containing Palladium on a side of the metal middle layer, on which the metal base layer is not formed.

12. The method according to claim 11, wherein:

the metal middle layer is formed on both of the two sides of the metal base layer, respectively, and the metal coating layer is formed on the side of the two metal middle layers respectively, on which the metal base layer is not formed.

13. The method according to claim 11, further comprising:

performing thermal treatment at a temperature higher than usage temperature of the hydrogen-permeable membrane on a layer group including the metal base layer and the metal middle layer which is formed on the metal base layer.

14. The method according to claim 11, wherein the metal base layer before the metal middle layer is formed contains the elemental metal having a substantially homogeneous distribution of concentration along a thickness direction of the hydrogen-permeable membrane.

15. A hydrogen-permeable membrane manufactured by the method according to claim 11.

16. The method according to claim 11, wherein the metal middle layer consists essentially of said at least one elemental metal selected from Nickel and Cobalt.

17. The method according to claim 11, wherein the metal middle layer consists of said at least one elemental metal selected from Nickel and Cobalt.

* * * * *